J. J. UPDEGRAFF.
Heating Stove.
No. 9,656.
Patented April 5, 1853.
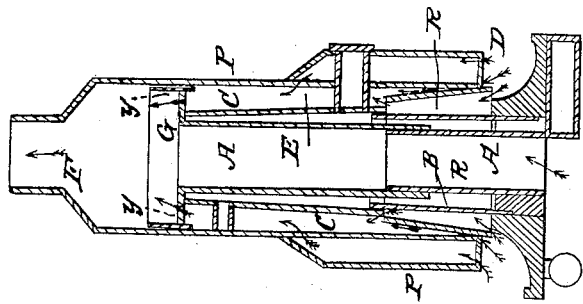
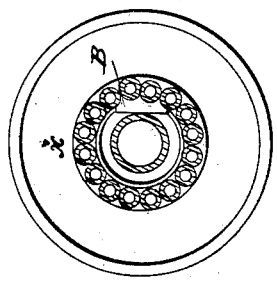
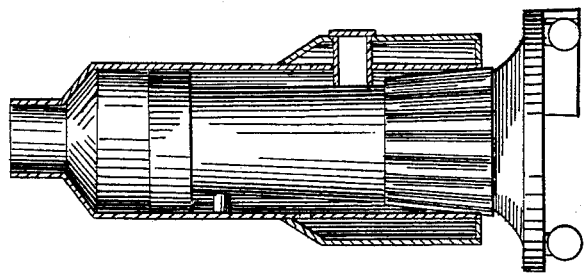

UNITED STATES PATENT OFFICE.

JOHN J. UPDEGRAFF, OF SELINS GROVE, PENNSYLVANIA.

STOVE.

Specification of Letters Patent No. 9,656, dated April 5, 1853.

*To all whom it may concern:*

Be it known that I, J. J. UPDEGRAFF, of Selins Grove, in the county of Union and State of Pennsylvania, have invented certain new and useful Improvements in Heating-Stoves, and that the following is a full, clear, and exact description of the principle or character which distinguishes them from all other things before known, and of the usual manner of making, modifying, and using the same.

My improvements consist chiefly in arrangements of the parts of the stove so as to combine an extensive radiating surface with an extensive air heating surface, or rather to make the two surfaces coextensive, and also in other arrangements or combinations for the economy of heat, as will be hereinafter specified.

Figure 1, exhibits a vertical section of the stove without the outer coating; Fig. 2, a horizontal section through the tubular fire pot; Fig. 3, a vertical section, with the outer casing.

By reference to the drawing it will be seen that there is a central air heating tube A, extending from the base of the stove through the fire pot to the top of the stove, and this tube leaves between itself and the fire pot an annular space or fire chamber R for the coal. The fire pot has a tubular wall; that is, the pot is so cast or made as that a part of the tubes shall be within the fire chamber and a part of the tubes without the fire chamber; and they are so cast as to be joined or connected firmly by their contiguous sides. This construction is clearly shown at B in the section Fig. 2. By this construction a large heating surface is exposed to the fire, a large radiating surface is exposed externally, and a large and advantageous provision is made for heating air on its ascent through the tubes. The air enters the bottom of these tubes, and ascends into the passage C as shown by the arrows. Exterior to this fire pot there is an outer casing P and where the heat is most intense it becomes a double casing or jacket perforated at the bottom, and the double part extends to a point just above the fire pot. This double casing serves also to convey heated air, and its inner wall, or that part toward and partly in contact with the tubular fire pot, receives residual heat therefrom by conduction or radiation; by conduction where it is in contact, and by radiation where it is not in contact, and it will be also seen by reference to the section Fig. 2 that air heating spaces $x$ $x$, are made between each two tubes and the inner wall of the jacket, as also shown by the direction of the arrows in Fig. 3. The air enters the bottom of the jacket at D, as shown by the arrows, and being heated rises, and passes through the openings E (which are arranged circularly around the inner wall) into the common chamber or passage C. The outer casing terminates below about on a level with the bottom of the tubes around the fire pot, so as to allow free space for the entrance of cold air. The heated air from the tubes around the fire pot unites with that from the spaces $x$ $x$, between the tubes and the inner wall of the outer casing and that from the double portion of the outer casing in one common passage C, as is plainly indicated by the arrows in the drawing, and these all unite with the column of heated air from the central passage, after passing through the perforations $y$, $y$, in the cover or cap G of the central tube, and pass off together through the pipe F, from which the hot air may be taken to the apartments to be heated.

It will be seen that if the outer casing is removed from the stove, it will then answer the purpose of a radiating and air heating stove for use in the apartment to be heated.

What I claim and desire to secure by Letters Patent is—

1. The combination of the central hot air passage, the annular fire chamber and tubular fire pot for the full economy of heat as set forth.

2. The combination of the outer casing P, the tubular fire pot and the central hot air passage in the manner described so that the currents from each may all unite and coöperate as set forth.

J. J. UPDEGRAFF.

Witnesses:
E. R. FITZHUGH,
R. CLEARY.